United States Patent [19]

Danielli

[11] Patent Number: 5,054,205
[45] Date of Patent: Oct. 8, 1991

[54] WIDE RANGE APPARATUS FOR CHECKING LINEAR DIMENSIONS OF PARTS

[75] Inventor: Franco Danielli, Zola Predosa, Italy

[73] Assignee: Marposs Societa' Per Azioni, Bentivoglio, Italy

[21] Appl. No.: 358,382

[22] PCT Filed: Sep. 12, 1988

[86] PCT No.: PCT/EP88/00830
§ 371 Date: May 9, 1989
§ 102(e) Date: May 9, 1989

[87] PCT Pub. No.: WO89/03511
PCT Pub. Date: Apr. 20, 1989

[30] Foreign Application Priority Data
Oct. 9, 1987 [IT] Italy ................................ 3639 A/87

[51] Int. Cl.⁵ .............................................. G01B 7/12
[52] U.S. Cl. ................................. 33/555.1; 33/501.04; 33/784
[58] Field of Search ....................... 33/555.1, 550, 551, 33/783, 784, 803, 807, 501.02, 501.03, 501.04, 556–558

[56] References Cited
U.S. PATENT DOCUMENTS
3,400,573  9/1968  Matter .
3,688,411  9/1972  Asano et al. ....................... 33/783 X
3,996,669 12/1976  Anichini .

FOREIGN PATENT DOCUMENTS
0238137  9/1987  European Pat. Off. .
0071905  4/1985  Japan ..................................... 33/783
2057688  4/1981  United Kingdom .

Primary Examiner—Harry N. Haroian
Attorney, Agent, or Firm—Stevens, Davis, Miller & Mosher

[57] ABSTRACT

Apparatus comprising a frame (1) and two slides (3, 7, 42; 4, 8, 42'), parallel and arranged side by side, each of which operated by a relevant motor (36, 36'). Coupled to each slide are a linear transducer (72; 72'), that detects the slide position, and a measuring head (15; 16) with a movable arm (18; 19) having a feeler (20; 21) adapted to contact the part (17). For making an apparatus featuring high accuracy and repeatability, but limited overall dimensions, and being adapted for checkings during machining, each slide comprises a linear guide rod (3; 4), movable with respect to the frame (1); a first support structure (7; 8) secured to the rod (3; 4) and arranged at a side of it for supporting the measuring head (15; 16); and a second support structure (42; 42') secured to the rod (3; 4). The second support structure (42; 42') is coupled to transmission means (34, 37, 38, 39, 40, 47; 34', 37', 38', 39',40', 47') actuated by the motor (36; 36') and supports one element 44; 44') of the linear transducer (72; 72'), that is arranged between the rod (3; 4) and the measuring head (15; 16). An apparatus for checking linear dimensions by a single feeler (20) can be manufactured by only using a slide (3), a motor (36) and linear transducer (72).

14 Claims, 3 Drawing Sheets

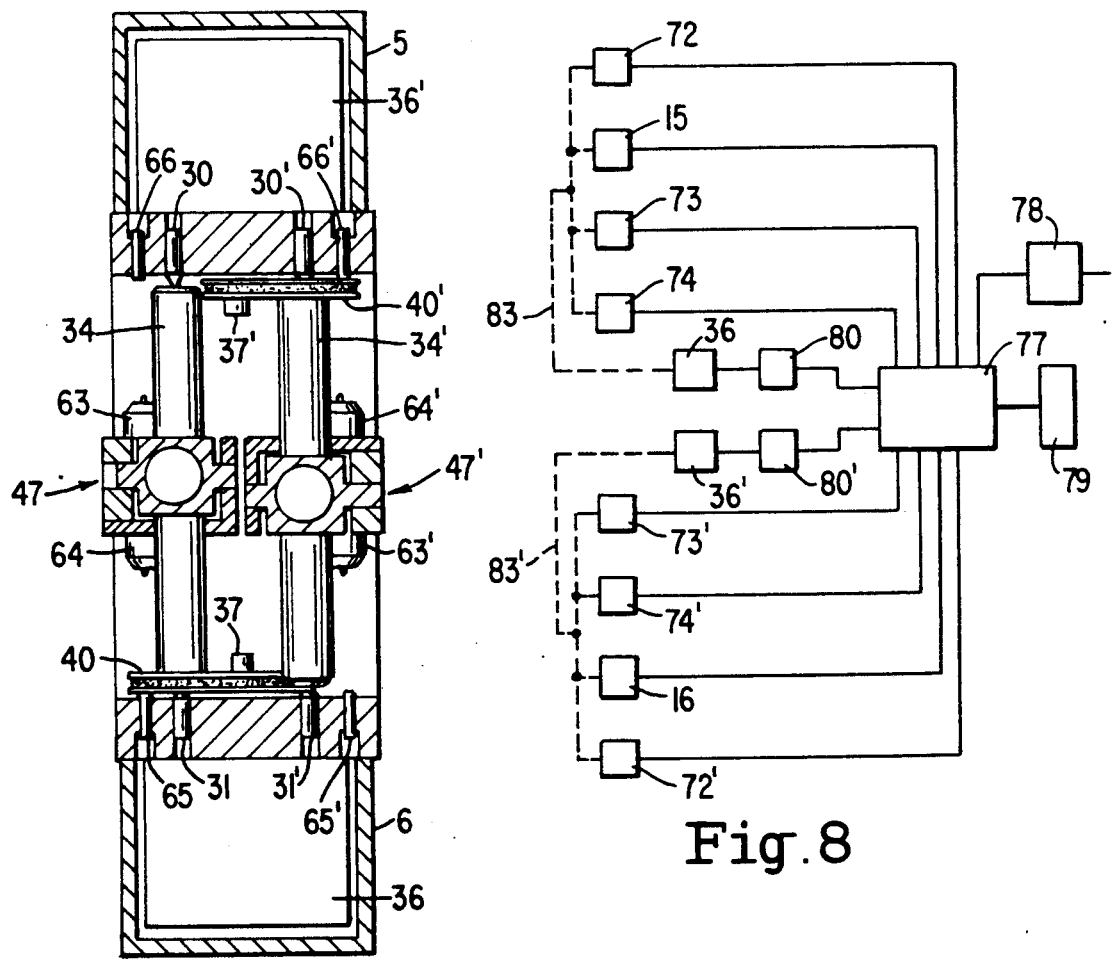
Fig. 6
Fig. 8
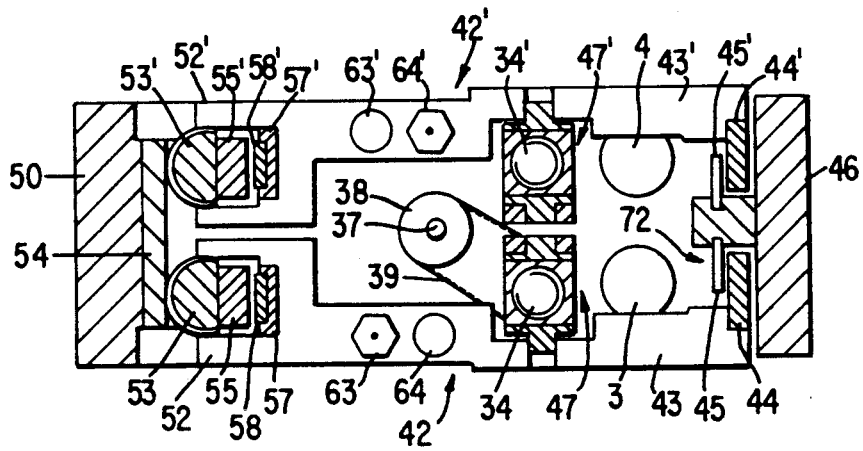
Fig. 7

WIDE RANGE APPARATUS FOR CHECKING LINEAR DIMENSIONS OF PARTS

TECHNICAL FIELD

The invention relates to a wide-range apparatus, for checking linear dimensions, such as diameters, of parts, comprising a frame; two slides, parallel and arranged side by side; two position transducers, respectively coupled to the slides; control means including two motors and two transmission devices for actuating the two slides, in an independent way; two measuring heads, each of which secured to a relevant slide; and processing and control means connected to the measuring heads, said position transducers and the motors, for controlling the motors and determining the part dimensions.

The invention also relates to an apparatus featuring a single structure instead of the substantially double and symmetrical structure of the above defined apparatus.

BACKGROUND ART

The demand for making apparatuses for measurements of linear dimensions featuring wide measurement ranges and high repeatability and accuracy is increasingly felt, also in view of the development of flexible manufacturing systems.

In particular, this demand arises for checking parts during grinding machining. In this case, in addition to the already mentioned requirements, there are those of small overall dimensions, high sturdiness, working reliability in harsh environment, quick response.

The requirement of having small overall dimensions is important for permitting the use of the apparatus without any need of performing heavy fitting in the grinding machine and for permitting easier part loading and unloading operations. During these operations the apparatus is generally moved away from the operating position by means of a slide or a rotating arm, but it is evident that small overall dimensions of the apparatus are of advantage on this regard, too.

At the same time, in order to obtain wide measuring ranges and high accuracies, it is necessary to use transducers and mechanical structures involving considerable minimum overall dimensions.

Patent application GB-A-2057688 discloses an apparatus that does not appear to be fit for providing a quite satisfactory compromise among the above mentioned contrasting requirements. This known apparatus comprises two vertical slides, arranged side by side, whose position is detected by corresponding wide-range digital measuring units. Each slide supports a rotating arm having a feeler adapted to contact the part whose diameter must be measured. The position of the rotating arm is detected by a small-range transducer, the signal of which controls, through a feedback loop, a motor actuating the slide by means of a threaded stem coaxial with the same slide and the motor. This control system tends to nullify the values of the signals of the two small-range transducers, so that the value of the part diameter is obtained by combining the signals of the two wide-range digital measuring units.

The known apparatus does not appear capable of guaranteeing very high repeatabilities and accuracies. Apart from the errors due to the obtainment of the part measurement only depending from the signals of the digital measuring units, the arrangement of the slides, of the digital measuring units and of the part is such as to necessarily involve not small errors. For example, the unavoidable errors due to the non-straightness and to the plays in the guides heavily affect the digital measuring units, that are arranged at a considerable distance from the vertical plane passing through the part axis, while this distance—in view of the well-known Abbe's principle —in the optimum conditions should be null.

Moreover, the known apparatus has a structure very open i.e. poorly protected, and that however is difficult to protect by envelopes, sealing devices, etc.

The size in the vertical direction is considerable, too, notwithstanding the use of slides and motors arranged side by side and of distinct digital measuring units.

U.S. Pat. No. 3,400,573 shows an apparatus that has many features—in particular the control system—similar to those of the apparatus previously described, but that uses a single wide-range transducer, and pneumatic sensors as measuring heads. Among the limits of this apparatus there is, in particular, a considerable size along the vertical direction.

U.S. Pat. No. 3,996,669 discloses a measuring apparatus comprising two vertical slides arranged one over the other, each of which is associated with a linear position transducer and carries a measuring head. The slides are actuated by relevant motors through threaded stems and cooperate with guide rods stationary with respect to a frame. This apparatus features a considerable size along the vertical direction and the arrangement of the linear position transducers and of the measuring heads, that are situated at opposite sides with respect to the driving stems and the rods for guiding the slides, may bring about considerable measurement errors. This apparatus, too, has a very open structure, that is not suitable for the provision of reliable protection and sealing devices.

The U.S. Pat. No. 3,996,669 patent also discloses a measuring apparatus having a single slide carrying a measuring head, and with the same arrangement of the linear position transducer and of the head.

DISCLOSURE OF INVENTION

The purpose of the present invention is that of obtaining a better compromise among the above mentioned contrasting requirements.

According to the invention, a wide-range apparatus for checking linear dimensions, such as diameters, of parts, comprises a frame; two slides, parallel and arranged side by side; two position transducers, respectively coupled to the slides; control means including two motors and two transmission devices for actuating the two slides, in an independent way; two measuring heads, each of which secured to a relevant slide; and processing and control means connected to the position transducers, the measuring heads and the motors, for controlling the motors and determining the part dimensions. Each slide comprises a linear guide rod, a first support structure coupled to the rod and arranged at a side of it for supporting the measuring head, and a second support structure, coupled to the rod, partially arranged at the opposite side with respect to the first support structure and elongated in a direction perpendicular to the guide rod. The second support structure has a portion coupled to the rod and a portion coupled to the transmission device actuated by the motor. The position transducer coupled to the slide is arranged between the measuring head and the guide rod.

According to another embodiment of the invention, the structure of the preceding apparatus can be modified, in substance halved, to obtain an apparatus including a single slide with relevant measuring head, etc.

The invention solves the problem of providing a wide-range measuring apparatus having very small overall dimensions, especially along the displacement direction of the slide or slides, high accuracies and repeatabilities, even in dynamic measurement conditions, a structure very sturdy and suitable for the arrangement of effective protection and sealing devices, for using the apparatus in harsh environment, too, for example for checking parts during machining on machine tools, such as grinding machines, or for checking—in the machine or out of the machine—after machining on grinding machines or turning machines.

By an apparatus of this kind the following results and advantages are obtained the strains, the frictions and the deformations that might bring about measurement errors are reduced and however the residual measurement errors may be easily compensated, almost totally; the apparatus structure is such as to considerably approach the optimum measurement conditions, in particular those defined by the basic Abbe's principle.

Moreover, the measurements can be obtained by combining the signals of the position transducer/s coupled to the slide/s with those of the measuring head/s, while at the same time the measuring head/s operate within rather small ranges.

BRIEF DESCRIPTION OF DRAWINGS

The invention is described more in detail hereinafter, through the support of the annexed drawings, given for non-limiting purpose, that show the preferred embodiment.

FIG. 6 is a section along the transversal direction, according to different vertical section planes of the measuring apparatus of FIG. 5;

FIG. 7 is a section along the longitudinal direction, according to different horizontal section planes, of a part of the measuring apparatus of FIGS. 5 and 6; and FIG. 8 is a block form diagram of the processing and control system of the measuring apparatus of FIGS. 1 to 7.

BEST MODE FOR CARRYING OUT THE INVENTION

Figure 1:
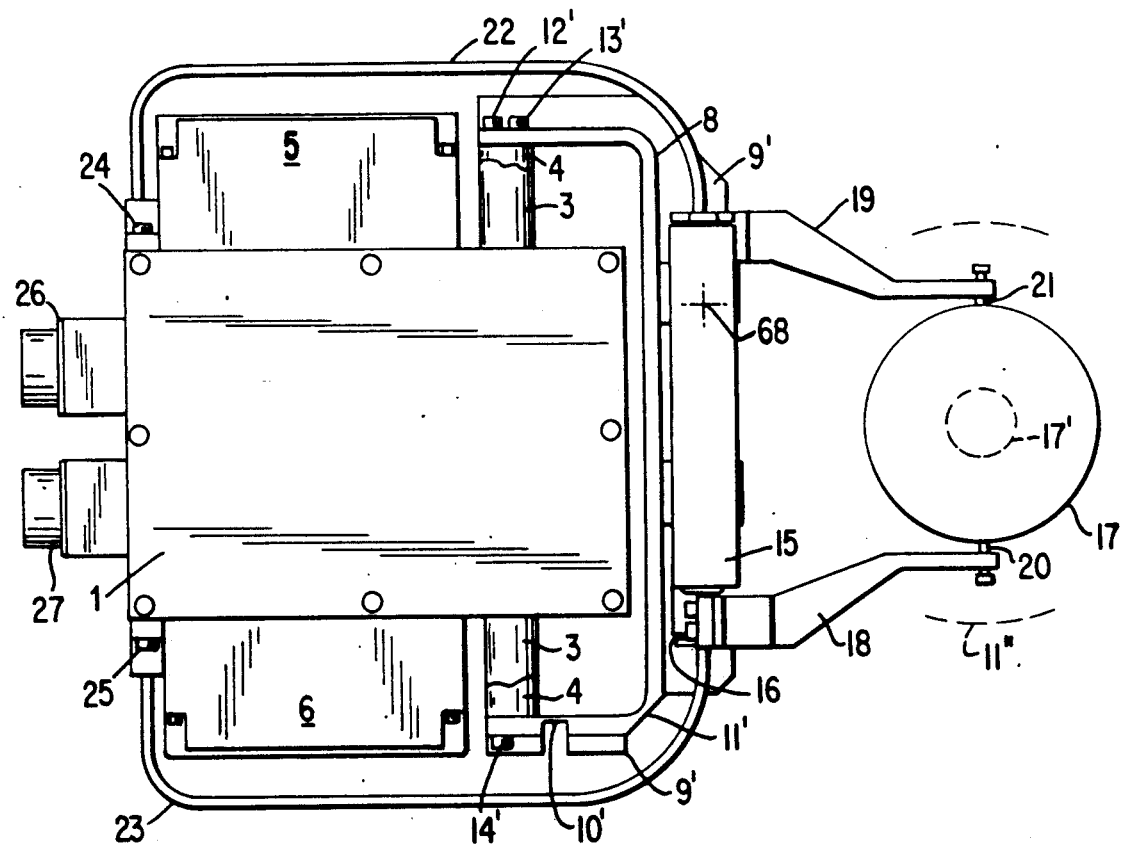
FIG. 1 is a side view of a measuring apparatus with two feelers, for checking diameters of parts in a wide measuring range.
Figure 2:
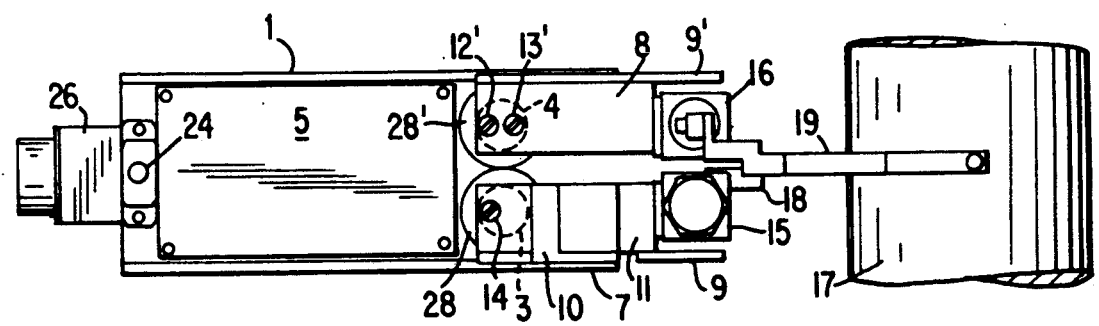
FIG. 2 is a plan view of the measuring apparatus of FIG. 1.
Figure 3:
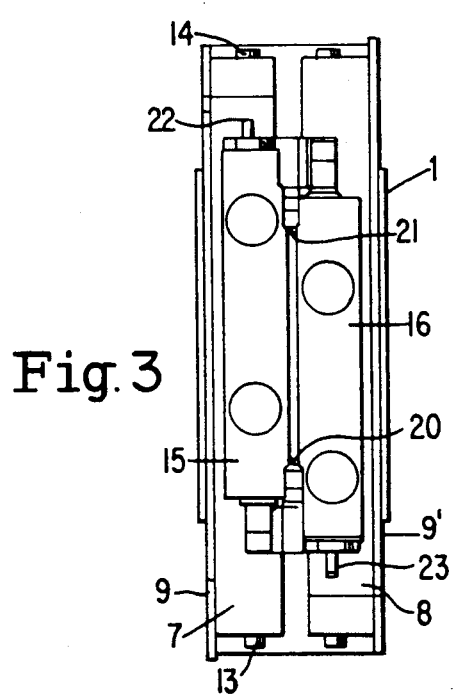
FIG. 3 is a front elevation of the measuring apparatus of FIGS. 1 and 2.
Figure 4:
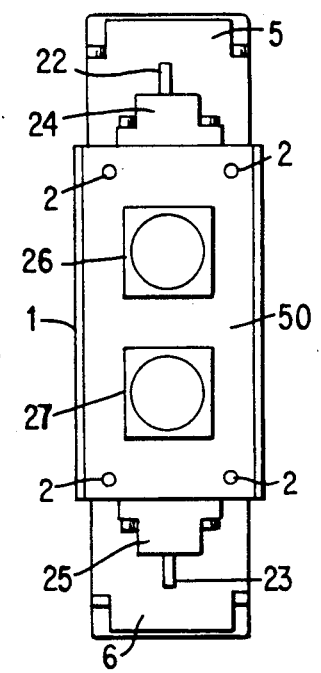
FIG. 4 is a rear view of the measuring apparatus of FIGS. 1 to 3.

With particular reference to FIGS. 1 to 4, the measuring apparatus comprises a frame, basically constituted by an envelope 1, having substantially the shape of a rectangular prism, and defining (FIG. 4) a back wall 50 with holes 2 for bolts for securing the apparatus to an external support frame, not shown. This frame—according to a typical application of the apparatus, for checking one or more diameters of parts during machining on an external cylindrical grinding machine—is mounted on a slide movable from a backward position, for permitting loading and unloading of the parts, to a measurement position.

Two support and guide cylindrical rods 3, 4, arranged side by side along the transversal direction of the apparatus and axially movable with respect to envelope 1, have ends coming out through the upper and lower walls of envelope 1.

The two rods 3, 4 are actuated by means of two motors housed in casings 5, 6 fixed, respectively, at the top and at the bottom of envelope 1. Coupled at the ends of rods 3, 4 are first support structures comprising support elements 7, 8. Support elements 7, 8 are identical, even if they are mounted arranged overturned with respect to each other, so that only element 8 coupled to bar 4 is now described. Element 8 is visible in FIG. 1 because, for convenience of illustration, in this figure element 7 is not shown.

Element 8 has substantially a C-shape, with an external wing 9.

For preventing excessive and unforeseeable deformations of rod 4, element 8 is structured and coupled to rod 4 so as to define an isostatic structure, substantially a simple frame with three hinges. For this purpose, element 8 has two sections with reduced thickness 10, 11, that can be assimilated to cylindrical hinges, and two ends, one of which rigidly fixed to the upper end of rod 4 through two screws 12', 13' and the other fixed to the lower end of rod 4 through a single screw 14' that acts onto suitable surfaces (not shown) so as to define, substantially, the third hinge.

Fixed to the central leg of elements 7, 8 are relevant comparative measurement heads 15, 16. Head 15 has been represented in FIG. 1, although element 7 is omitted. Heads 15, 16 are arranged, overturned by 180° with respect to each other, at an equal distance from a longitudinal symmetry plane of the apparatus, and comprise arms with external sections 18, 19 carrying feelers 20, 21 adapted to contact diametrically opposite points of part 17. Part 17 has its diameter corresponding to the intermediate value of the measurement range of the apparatus, and in FIG. 1 references 17', 17" denote other parts (or other sections of the same part) having diameters corresponding to the ends of the measurement range.

External sections 18, 19 of the movable arms are elongated both along the transversal direction—so that feelers 20, 21 are always arranged in the longitudinal symmetry plane of the apparatus—and along the longitudinal direction, perpendicularly to the geometric axes of rods 3&4 and of the casings of heads 15, 16.

The cables 22, 23 of heads 15, 16, that are completely shown in FIG. 1 only, reach the inside of envelope, 1 through cable clamping devices 24, 25. Two connectors 26, 27 are fixed to the rear wall of envelope 1.

Figure 5:
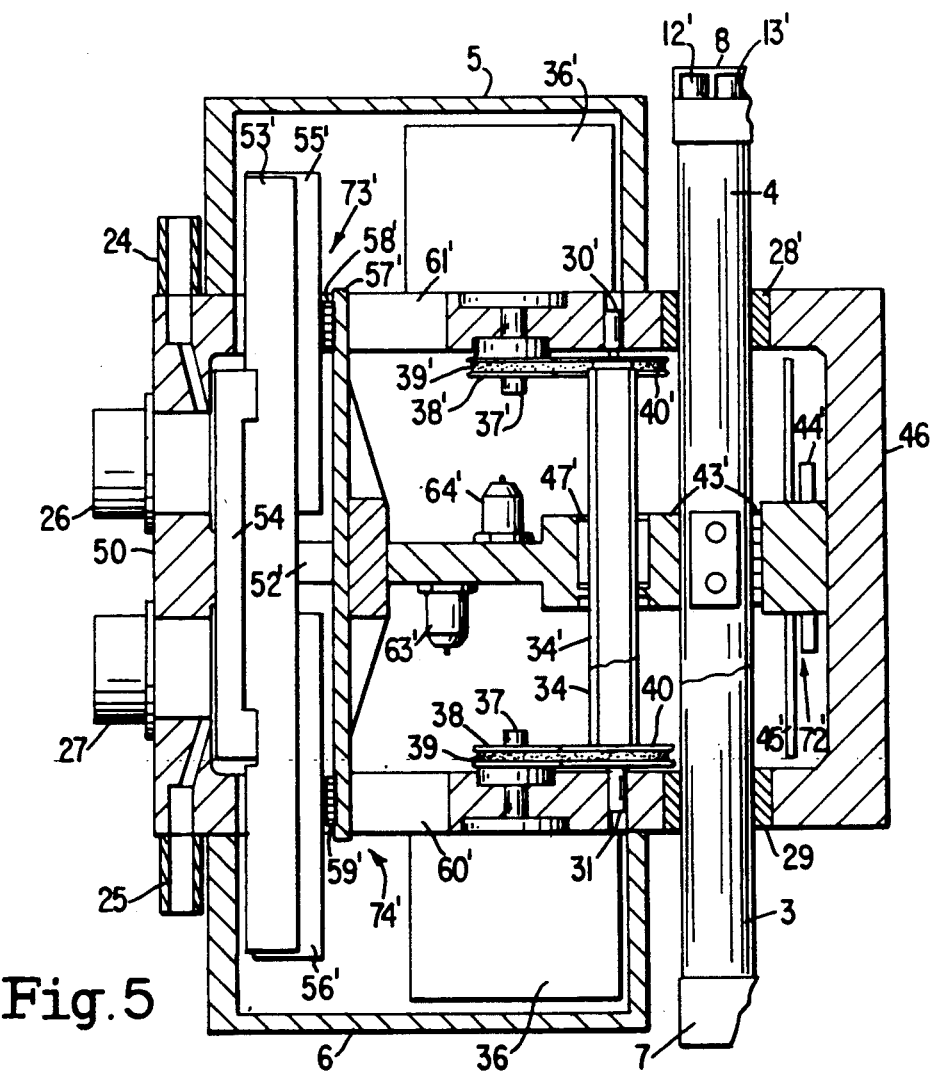
FIG. 5 is a section along the longitudinal direction of the measuring apparatus of FIGS. 1 to 4, according to different vertical section planes and with an enlarged scale.

The internal structure of the apparatus is now described with particular reference to FIGS. 5 to 7, in which some elements are not shown, for simplification purpose. As already made hereinbefore, since the apparatus has, in substance, a double and symmetrical structure, the description of many elements applies, with possible obvious changes, to corresponding elements, some of which are denoted in the figures with the same reference numbers, with or without apices. Moreover, for the purpose of simplification, in FIGS. 6 and 7, two side elements for the closure of envelope 1 are not shown.

Movable rods 3, 4 are vertically guided by sealing and guide means, basically consisting of two pairs of bushings fixed to the upper base and the lower base of envelope 1, in correspondence with relevant holes. A bushing 29 cooperating with rod 3 and a bushing 28' cooperating with rod 4 are visible in FIG. 5.

Secured to the upper and lower bases of envelope 1, too, are two pairs of centres 30, 31, 30', 31' permitting the rotation of two threaded shafts 34, 34'.

The motor 36 housed within casing 6 has a shaft 37 onto which there is secured a toothed pulley 38 that drives shaft 34 through a toothed belt 39 and another toothed pulley 40.

Secured to rod 3 is a second support structure 42 comprising a portion 43 arranged at the same side as measuring head 15. Portion 43 is fixed to rod 3 and supports a slider 44 of a linear position transducer 72, of incremental type, whose scale 45 is fixed to a support element rigidly coupled to the front wall 46 of envelope 1.

The second support structure 42 comprises a joint 47, substantially of universal type, coupled to threaded shaft 34 so as to provide a transmission device transmitting to support structure 42 only forces tending to vertically translate support structure 42 and, together with it, measuring head 15 and slider 44. Thus, transmission means including shafts 34, 37, belt 39, pulleys 38, 40 and joint 47 actuate the slide including rod 3 and first and second support structures 7, 42.

The second support structure 42 extends toward rear wall 50 of envelope 1 and ends with a fork-shaped portion 52 that engages, with small transversal play, the external wall of a rod 53 secured to the rear wall 50 of envelope 1 through a coupling element 54. Rod 53 has a partially cylindrical shape, with a longitudinal flat portion to which there are secured two prismatic elements or bars 55, 56—made of ferrite—aligned along the vertical direction.

The second support structure 42 also comprises a support element constituted by a vertical prismatic bar 57 carrying, next to its ends, two parts 58, 59 of relevant compensating inductive transducers 73, 74 that also comprise ferrite elements 55, 56. Parts 58, 59, schematically shown in FIGS. 5 and 7, are constituted by supports carrying electric windings fed by cables, not shown.

Prismatic bars 57, 57' vertically translate passing through openings 60, 61, 60', 61' of envelope 1. In fact, the ends of prismatic bars 57, 57' are housed within casings 5, 6.

Accordingly, rods 53, 53' perform two functions: by cooperating with fork-shaped portions 52, 52', they act as antirotation devices, so that the rotation of shafts 34, 34' brings about translations of the second support structures 42, 42' with rods 3, 4; the other function is that of support for ferrite elements 55, 56, 55', 56', that act as linear reference rules of the compensating transducers. The use of the ferrite for elements 55, 56, 55', 56' is, preferred because it provides very uniform magnetic features.

Fixed, to the second support structures 42, 42' are microswitches 63, 64, 63', 64' that can cooperate with limit stops 65, 66, 65', 66' secured to the upper and lower walls of envelope 1 for controlling the end of the upward or downward translating motion of support structures 42, 42'.

Measuring heads 15, 16 can be made as described in patents U.S. Pat. No. 4,356,634 and 4,370,812, apart from the different shapes of the external sections of the movable arms. Heads 15, 16 can be filled with a dampening liquid, for example silicone oil, for dampening the motion of the movable arms, particularly if the parts to be checked have a discontinuous surface.

For reducing the strains affecting the fulcrums for rotation of the movable arms, heads 15, 16 and the movable arms, in particular sections 18, 19, have such a structure and arrangement that, within the small operating range of the heads, each feeler and the relevant fulcrum are arranged, substantially, along a direction perpendicular to the guide rod of the head, as it is visible in FIG. 1 for feeler 21 and the corresponding fulcrum, denoted by reference 68.

Important as far as the repeatability and the accuracy of the measurements are concerned is the arrangement of linear transducers 72, 72' next to the front wall 46 of the apparatus. Also important are the isostatic structures 7, 8 supporting heads 15, 16.

However, possible inclinations of rods 3, 4 may cause measurement errors, that basically depend on the distance of transducers 72, 72' from the axis of part 17. Compensating transducers 73, 74, 73', 74' permit the effective compensation of these errors by detecting the inclination of rods 3, 4. The accuracy of this measurement can be high, so long as a sufficient distance among elements 58, 59 and 58', 59' is foreseen.

FIG. 8 shows the connection between the measuring and actuation means and the processing, indicating and control means of the apparatus.

Measuring heads 15, 16, linear transducers 72, 72' and compensating transducers 73, 74, 73', 74' are connected to a programmable processing, indicating and control unit 77. Moreover, unit 77 is connected to a programmable controller 78, that controls the grinding machine, to a group 79 with programmation keyboard and display devices, and to driving circuits 80, 80' for controlling motors 36, 36'.

Motors 36, 36' are actuated independently from each other on the basis of programmable parameters, such as different displacement speeds for rods 3, 4 and thus heads 15, 16, possibly depending on the nominal dimensions of part 17 and the foreseeable stock values to be removed by grinding. Therefore, as sketched by short dashed lines 83, 83' in FIG. 8, motors 36, 36' cause heads 15, 16, sliders 44, 44' of linear transducers 72, 72' and parts 58, 59, 58', 59' of compensating transducers 73, 73', 74, 74' to translate as far as feelers 20, 21 enter into contact with part 17. Then motors 36, 36' are controlled so as to keep the measurement signals of heads 15, 16 within a pre-set interval, comparatively short to the benefit of the linearity, accuracy and repeatability of the measurements, but sufficiently wide to prevent instabilities that might be originated also by shape errors of part 17.

In substance, motors 36, 36' are stopped when the signals of heads 15, 16 are within said interval (and the measured part diameter is different from the nominal value to be obtained through machining), and they are started when the signals come out of said interval.

A measurement signal indicative of the radial distance between feeler 20 and the rotation axis of part 17 is obtained by combining the signals of head 15, incremental transducer 72 and compensating transducers 73, 74. The value of the other radius, corresponding to the distance between feeler 21 (contacting part 17) and the rotation axis of part 17 is obtained in a similar way.